United States Patent [19]

Gagnon

[11] Patent Number: 4,608,824

[45] Date of Patent: Sep. 2, 1986

[54] HYDRAULIC MOTOR FOR CARS

[76] Inventor: David C. Gagnon, 227 Whipple St., Fall River, Mass. 02721

[21] Appl. No.: 628,803

[22] Filed: Jul. 9, 1984

Related U.S. Application Data

[63] Continuation-in-part of Ser. No. 289,795, Aug. 3, 1981, abandoned.

[51] Int. Cl.[4] .............................................. F16D 31/02

[52] U.S. Cl. .......................................... 60/325; 60/412

[58] Field of Search .................................. 60/325, 412

[56] References Cited

U.S. PATENT DOCUMENTS

| | | | |
|---|---|---|---|
| 3,563,032 | 2/1971 | LaPointe | 60/412 |
| 3,838,574 | 10/1974 | Gelders | 60/325 |
| 3,948,047 | 4/1976 | Gilbert | 60/325 |
| 4,007,591 | 2/1977 | Hinchman et al. | 60/325 |
| 4,031,701 | 6/1977 | Upjohn | 60/325 |
| 4,086,764 | 5/1978 | Brown et al. | 60/325 |
| 4,404,800 | 9/1983 | Penny | 60/412 |

*Primary Examiner*—A. Michael Chambers

[57] ABSTRACT

This disclosure involves the conversion of a four cycle internal combustion engine to that of an hydraulic or fluid motor, wherein engine heads, camshafts and valves are changed, and the invention can be used to power automobiles, power plants, conveyors, earthmovers, etc.

1 Claim, 3 Drawing Figures

HYDRAULIC MOTOR FOR CARS

This is a continuation-in-part of my pending application, Ser. No. 06/289,795 filed on Aug. 3, 1981, which is now abandoned.

SUMMARY OF INVENTION

This invention relates generally to changing internal combustion engines into hydraulic or fluid motors.

An object of this invention is to convert an internal engine to an hydraulic motor;

Another object of this invention is to convert an internal combustion engine to an hydraulic motor and increase torque output.

Another object of this invention is to convert an internal combustion engine, connected to a drive train and load, to an hydraulic motor, and utilize another form of energy to provide motive means to drive said motor and load.

Still another object of this invention is to change hydraulic fluid energy inexpensively to rotational torque energy on an output shaft.

These and other objects will be more readily evident upon a study of the detailed description and drawings.

DESCRIPTION OF THE PREFERRED EMBODIMENT

Figure 1:
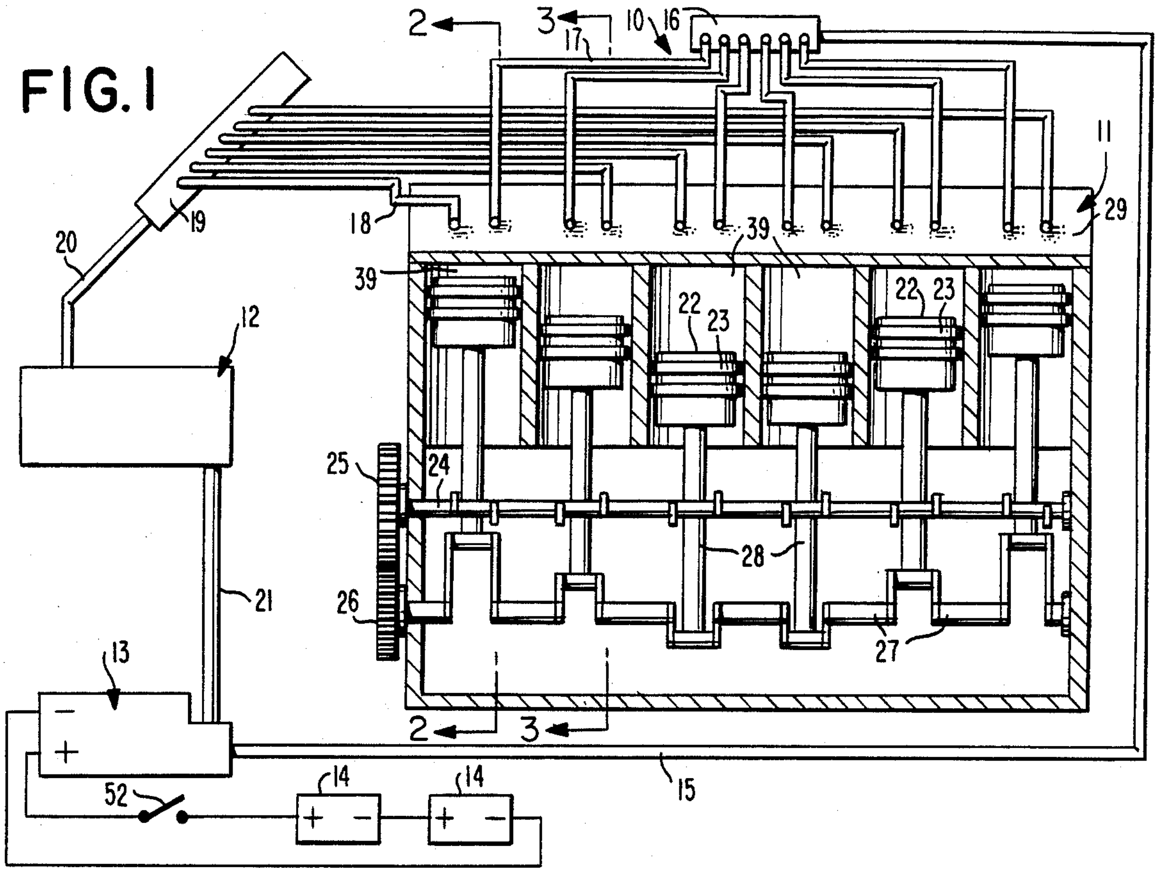
FIG. 1 is a diagram of the invention depicting a six cylinder automobile engine, with modifications including electrical pump power means to drive it.

Referring now to the drawing, this invention is shown generally by numeral 10 as a complete operative system comprising the hydraulic motor 11, with block 53, hydraulic fluid tank 12, and electric pump 13, with necessary power batteries 14.

Hydraulic feed lines interconnect the various components to make it an operative system. Main feed line 15 supplies fluid from pump 13 to fluid feed distribution block 16, individual feed lines 17 supply each cylinder 39. Individual return lines 18, connected to each cylinder 39, return the fluid from the cylinder 39 to fluid return collection block 19, through main return line 20 to tank 12. From hydraulic fluid tank 12, the fluid is pumped by pump 13 through main supply line 21, to continue the cycle.

Numeral 39 designates the cylinders of the hydraulic motor, which has pistons 22 slidingly mounted therein, with teflon rings 23 providing seals therefor, as the pistons are moved by hydraulic fluid pressure to and fro within the cylinders 39. The pistons are connected by pins (not shown) to rods 28, which are connected to crankshaft 27.

Crankshaft 27 is connected by way of a drive train (not shown) to any type of diverse equipment, such as automobiles, transfer cases, belting apparatus to drive farm equipment, transmissions to drive prime movers, saw mills, conveyors, hoists, earth moving equipment, etc. Numeral 26 designates the crankshaft gear which drives the camshaft 24 by way of camshaft gear 25.

Numeral 29 designates the hydraulic motor head, to which is connected individual feed lines 17 and individual return lines 18. Head 29 is mounted to the motor by way of head bolts (not shown).

Figure 2:
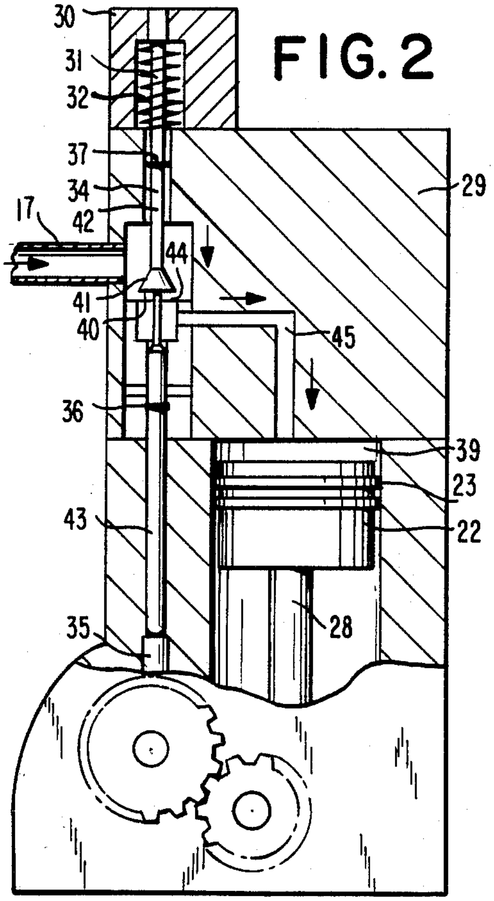
FIG. 2 is a sectional view of FIG. 1, taken at 2—2, showing the valve-pushrod relationship on the intake of the cycle.

Referring to FIG. 2, the invention is shown in section, through 2—2 in FIG. 1. This section shows with arrows the direction of hydraulic fluid flow to move piston 22 through cylinder 29, when a cam lobe is forcing lifter 35 upward, to cause intake valve 34 to be open. Intake valve 34 comprises valve tail 41, which has a conical shape, valve stem 42, upon which valve spring 32 acts by way of valve pin 33, and valve pushrod 43, against which lifter 35 pushes, to push valve face 40 away from valve seat 44. Intake valve 34 is kept closed at valve seat 44 by valve spring 32 being forced downwardly by the valve spring enclosure housing 30, which is secured to head 29 by bolts, for example.

Figure 3:
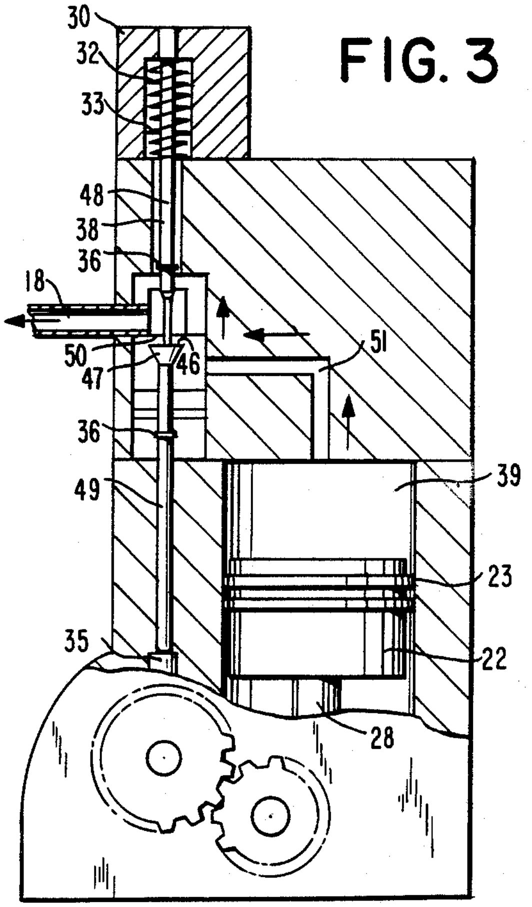
FIG. 3 is a sectional view of FIG. 1, taken at 3—3, showing the valve-pushrod relationship on the exhaust of the cycle.

Referring to FIG. 3, the invention is shown in section through 3—3 in FIG. 1. Arrows show the direction of hydraulic fluid flow, as it is being exhausted from cylinder 39. The lifter 35 is at its low point of travel, and valve spring 32 forces exhaust valve 38 downwardly, to open valve port 51, by moving valve face 46, valve tail 47 of a conical shape, valve stem 48, engageable by valve spring 32 and valve pin 33, valve push-rod 49, engageable by lifter 35. 0-rings seals 36 and 37 are disposed axially thereon. Exhaust valve 38 opens port 51 by valve face 46 being moved from engagement with valve seat 50, by valve spring 32 pressing against the inner surface of a valve spring enclosure housing 30 and against valve pin 33, when camshaft 24 turns and lifter 35 drops off a lobe.

In operation, referring to FIG. 1, switch 52 is closed, completing the circuit to batteries 14, causing electric pump 13 to pump hydraulic fluid from tank 12 through main supply line 21, out through main feed line 15 to feed distribution block 16. From feed distribution block 16, hydraulic fluid is pumped into feed line 17 to cylinder 39 (see FIG. 2), by way of valve port 45, which has been opened by intake valve 34 having been forced open against the spring pressure of valve spring 32, by lifter 35 engaging valve push-rod 43, by the rotation of camshaft 24 by way of camshaft gear 25 and the cam lobe interaction. This action causes piston 39 in FIG. 2 to move downward. Intake valve 34 keeps port 45 open, until the bottom of the piston stroke is reached, at which time it is closed by valve spring 32 pressure, because the cam shaft has moved off of the lobe, causing lifter 35 to raise. Also, because of constant hydraulic pressure and the conical shape of the valve tail at 41, the valve stays closed. For clarification, downward movement of the piston 22 causes rod 28 to turn crankshaft 24; however, once the piston reaches the bottom of its stroke, it must again come upwardly, hence, the exhaust cycle begins.

The exhaust cycle, shown by arrows in FIG. 3, will now be explained. The camshaft is absent a lobe on this portion of the cycle, hence, the valve spring 32, by engaging valve spring enclosure housing 30 and valve pin 33, have caused exhaust valve 38 to open at valve face 46 and seat 50, thereby opening valve port 51, and allowing the hydraulic fluid to flow into individual return line 18, to return collection block 19 back through main return line 20 to hydraulic fluid tank 12. This same sequence is followed on each cylinder, and controlled by the lobes on the camshaft for valve opening and closing.

To convert a conventional internal combustion engine into an hydraulic motor, for best performance, there has been formed a new head, the cam shaft lobe arrangement has been modified, a new type valve has been provided, integral with a push rod and an opposed end stem, and hydraulic pump and line means has been provided. With this invention, a one cylinder four cycle, as well as plural cylinder internal combustion engines can be modified. For every revolution of the crankshaft, both the intake and exhaust valves must open and close successively, and a valve must be open substantially at all times.

To modify a conventional six cylinder engine, such as the one depicted, the conventional exhaust and intake manifolds are removed, the conventional head is removed, the conventional camshaft is removed, and the conventional pushrods are removed. Then, there is provided a new head 29, with parts such as 45 and 51, lines such as 17 and 18, new exhaust and intake valves such as 38 and 34 assemblies, a modified camshaft 24, preferably teflon seal rings 23 on conventional pistons and appropriate valve springs, and an enclosure like that of numeral 30.

This hydraulic motor can be driven by any form of hydraulic fluid pump powered by any of the well known energy sources.

Various fluids, such as water, oils, and gases, are anticipated for use in this invention.

The foregoing is considered illustrative only. Further, since numerous modifications and changes will readily occur to one skilled in the art, it is not desired to limit this invention to that specifically described.

What I claim is:

1. A hydraulic motor for a car, comprising, in combination, an automotive vehicle engine for travel self-propulsion, including a block, a plurality of cylinders in said block, a piston slidable in each said cylinder, a crankshaft in said block, a piston rod connected between said crankshaft and each said piston, a power take-off gear on said crankshaft for said travel self-propulsion, and said engine including a hydraulic means for driving said pistons in said cylinders, wherein said hydraulic means comprises a head bolted upon said block, a first hydraulic system inside said head to urge said pistons in one direction and a second hydraulic system inside said head to urge said pistons oppositely, a camshaft suported in said block, a gear on said camshaft driven by said crankshaft take-off gear, a first set of cams and a second set of cams along said camshaft, a pair of said first and second said set cam driving each said piston, and each said first and second hydraulic systems comprising a cam-following lifter resting upon one said cam, a valve push rod bearing at one end against each said cam and having an opposite end bearing against a compression spring, a conical valve affixed along said push rod and located inside a chamber inside said head, said chambers of said first system intercepting a passage between a hydraulic fluid entry port on said block and said cylinder, said chambers of said second system intercepting a passage between said cylinder and a hydraulic fluid exhaust port on said block; and further a hydraulic means between all said exhaust ports and all said entry ports comprising branch lines from said exhaust ports to a hydraulic oil reservoir tank, a line between said tank and an electrically powered pump, and branch lines between said pump and all said entry ports.

* * * * *